(12) United States Patent  (10) Patent No.: US 7,280,050 B2
Lee  (45) Date of Patent: Oct. 9, 2007

(54) BROADCAST RECEIVING TERMINAL AND METHOD FOR DIGITAL STREAM DATA DECODING

(75) Inventor: Sung Ho Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/430,332

(22) Filed: May 8, 2006

(65) Prior Publication Data

US 2006/0250284 A1     Nov. 9, 2006

(30) Foreign Application Priority Data

May 9, 2005    (KR) ...................... 10-2005-0038395

(51) Int. Cl.
*H03M 7/00*    (2006.01)
(52) U.S. Cl. ...................................... 341/50
(58) Field of Classification Search ............ 341/50, 341/59, 58, 87; 348/461, 462; 375/240.26
See application file for complete search history.

(56) References Cited

U.S. PATENT DOCUMENTS 5,684,804 A * 11/1997 Baronetti et al. ........... 370/509
6,157,674 A * 12/2000 Oda et al. ................... 375/240
6,687,305 B1 * 2/2004 Nakamura et al. ...... 375/240.26

FOREIGN PATENT DOCUMENTS

JP          11-088878        3/1999
KR   10-2000-0000570 A      1/2000

* cited by examiner

*Primary Examiner*—Brian Young
(74) *Attorney, Agent, or Firm*—Lee, Hong, Degermar, Kang & Schmadeka

(57) ABSTRACT

An apparatus and method for decoding digital stream data includes detecting a discontinuous period of digital stream data stored in a buffer, such that upon detection of the discontinuous period, a further operation includes decoding all currently stored portions of the digital stream data in the buffer using non-updated reference time information. The non-updated reference time information may be defined as the reference time information used for decoding the digital stream data prior to the discontinuous period. An additional operation includes decoding remaining portions of the digital stream data using updated reference time information.

17 Claims, 5 Drawing Sheets

BROADCAST RECEIVING TERMINAL AND METHOD FOR DIGITAL STREAM DATA DECODING

CROSS-REFERENCE TO RELATED APPLICATIONS

Pursuant to 35 U.S.C. § 119(a), this application claims the benefit of earlier filing date and right of priority to Korean Application No. 10-2005-0038395, filed on May 9, 2005, the contents of which are hereby incorporated by reference herein in its entirety

BACKGROUND OF THE INVENTION

1. Field of the Invention

The present invention relates to a digital broadcast receiving terminal, and more particularly to such a terminal configured to rapidly recover audio/video lip synchronization (Lipsync) of recorded stream data.

2. Discussion of the Related Art

FIG. 1 is a diagram depicting a terminal operatively associated with vehicle 5, which is in motion relative to broadcasting center 10. While the vehicle is in motion, the terminal may receive a digital broadcast transmitted from broadcasting center 10 along various paths. By way of example only, the terminal is shown receiving a digital broadcast along paths A, B, and C via satellite 20, and along paths A-1, B-1, and C-1 through repeater 30. The repeater acts as a gap filler to provide broadcast coverage in the satellite shadow regions.

Transmission paths A, A-1, C, and C-1 are examples of acceptable reception environments during which the terminal may receive broadcast signals of sufficient strength and quality. Conversely, transmission paths B and B-1 represent a compromised reception environment during which the terminal does not receive the desired signal level.

FIG. 2 provides an example of stored digital stream data which may result from receiving a digital broadcast by the moving terminal of FIG. 1. The illustrated arrangement includes three distinct sections of stored digital stream data, and more specifically, a discontinuous section between two continuous sections. Both continuous sections are defined by stream data having been received in a continuous manner.

In accordance with the example of FIG. 2, stream data 1 is consistent with data received during a period of time that the moving terminal was located along transmission path A or A-1 (FIG. 1). On the other hand, stream data 2 is consistent with data received during a period of time that the moving terminal was located along transmission path C or C-1. The third region represents a discontinuous region during which the moving terminal was located in a compromised reception environment (e.g., tunnel 35), such as when the moving terminal was located along transmission (or lack thereof) path B or B-1.

Stream status data is typically used to identify the continuous or discontinuous status of data received at the terminal. The example of FIG. 2 therefore results in stream status data having a "continuous" value when the moving terminal receives either of stream data 1 or stream data 2. Stream status data may have a value of "discontinuous" when the terminal is located in a compromised receiving environment, such as along transmission path B or B-1.

Stream data that has been stored with a discontinuous section presents a problem during playback of the stream data. In particular, a time information error may occur because of the lack of continuity of recording the stream data. This lack of continuity requires a significant amount of time to recover lipsync of the audio and video of the stream data.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof, as well as the appended drawings.

In accordance with an embodiment, a method for decoding digital stream data includes detecting a discontinuous period of digital stream data stored in a buffer, such that upon of the discontinuous period, the method further includes decoding all currently stored portions of the digital stream data in the buffer using non-updated reference time reference. The non-updated reference time information may be defined as the reference time information used for decoding the digital stream data prior to the discontinuous period. The method may further include decoding remaining portions of the digital stream data using updated reference time information.

In one aspect, the method further includes receiving the digital stream data at a terminal which is moving relative to a broadcasting system providing the digital stream data.

In another aspect, the method further includes storing the digital stream data in memory of a digital broadcast receiving terminal.

In yet another aspect, the method further includes temporarily ceasing storage of new digital stream data in the buffer during the decoding of all currently stored portions of the digital stream data.

In still yet another aspect, the method further includes storing the digital stream data in the buffer.

In accordance with an alternative embodiment, a method for decoding digital stream data includes acquiring information about a discontinuous period contained in recorded digital stream data, pre-processing a portion of the digital stream data within the discontinuous period according to discontinuous period information, and post-processing a portion of the digital stream data subsequent to the discontinuous period according to continuous period information.

In one aspect, the pre-processing includes decoding a portion of the digital stream data stored in a buffer using a composition time stamp (CTS) that is prior to the discontinuous period, and detecting when the buffer is empty.

In another aspect, the post-processing includes updating an existing object clock reference with a new object clock reference, and storing a portion of the digital stream data to be decoded using a new composition time stamp (CTS) in a buffer.

In accordance with yet another embodiment, a digital broadcast receiving terminal includes a memory for storing digital stream data, and a demultiplexer for demultiplexing the digital stream data to provide audio/video (A/V) data, and for providing stream status data which identifies a presence or absence of discontinuity of the digital stream data. A buffer may be used for temporarily storing the A/V data, and a decoder is utilized for decoding the A/V data obtained from the buffer. A controller is typically used to generate control signals to control the buffer and decoder responsive to the stream status data.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 3:
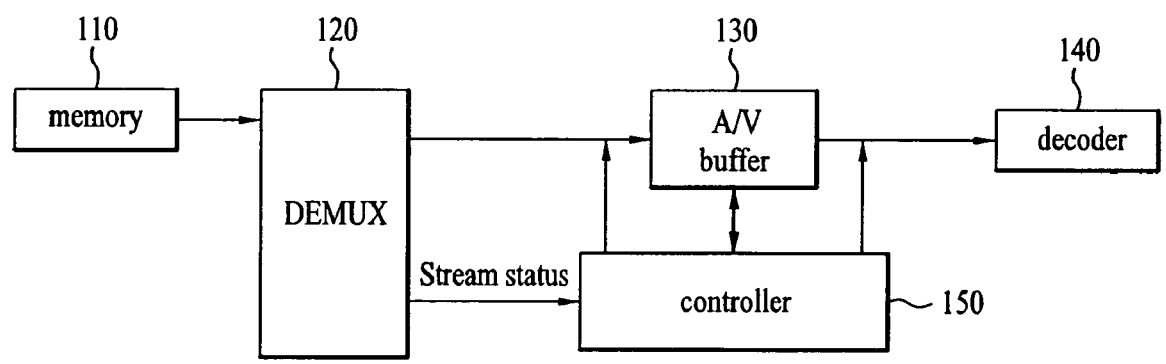
FIG. 3 is a schematic block diagram depicting relevant portions of a digital broadcast receiving terminal in accordance with an embodiment of the present invention.

FIG. 3 is a schematic block diagram depicting relevant portions of a digital broadcast receiving terminal in accordance with an embodiment of the present invention. The terminal is shown having memory 110 and demultiplexer 120. The memory is typically configured to store recorded digital stream data. The demultiplexer may be used for demultiplexing the stream data received from memory 110 to separate the audio and video data from the stream data, as well as extract parameters from the stream data (e.g., presence of a discontinuous section).

Figure 1:
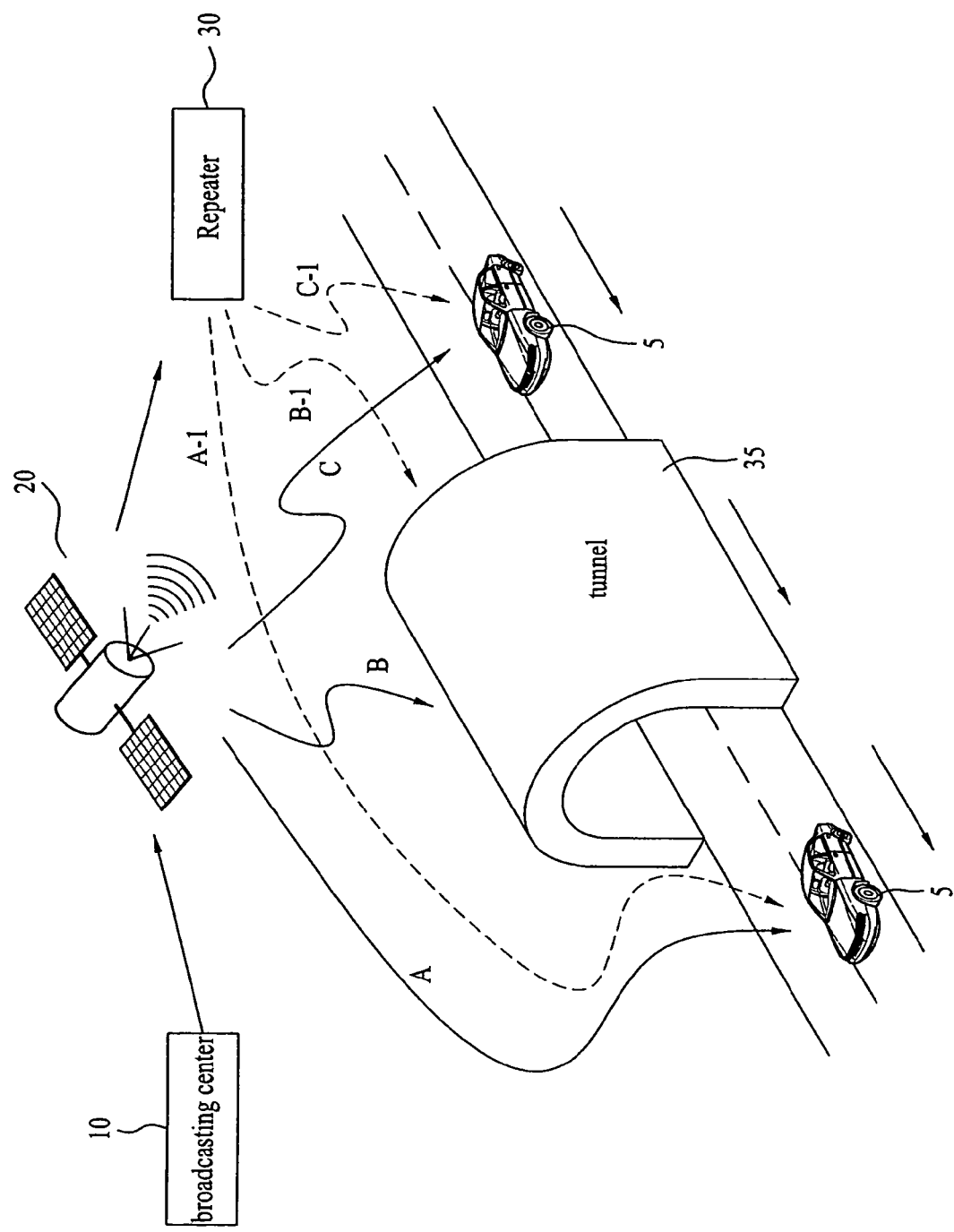
FIG. 1 is a diagram depicting a terminal operatively associated with a vehicle which is in motion relative to a broadcasting center.
Figure 2:
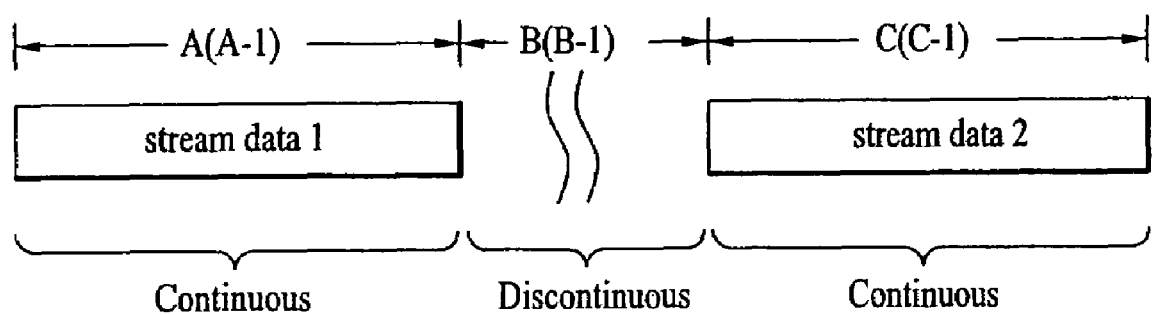
FIG. 2 provides an example of stored digital stream data which may result from receiving a digital broadcast by the moving terminal of FIG. 1.

Demultiplexer 120 is also shown providing stream status data to controller 150. Stream status data is based on the extracted parameters and may be used to identify or otherwise determine periods of discontinuity of stream data previously received by the terminal, such as that depicted in FIG. 2.

The terminal also includes audio/video (A/V) buffer 130 for temporarily storing the separated audio and video data (also referred to herein as A/V data) received from demultiplexer 120. Decoder 140 may be used for decoding the A/V data stored in the A/V buffer.

Controller 150 may be configured to output signals for controlling operation of the A/V buffer and decoder responsive to the stream status data provided by demultiplexer 120. One function of the controller is to manage the temporary storage of the A/V data in A/V buffer 130. The controller also controls the decoding of the data stored in A/V buffer 130 using time information (e.g., a composition time stamp (CTS)). This time information is controlled based upon the status of the recorded stream data (i.e., continuous or discontinuous). The terminal may be implemented using any of a number of different types of terminals, including a satellite digital broadcast receiving terminal, a terrestrial digital broadcast receiving terminal, or a combination satellite/terrestrial digital broadcast receiving terminal.

Figure 4:
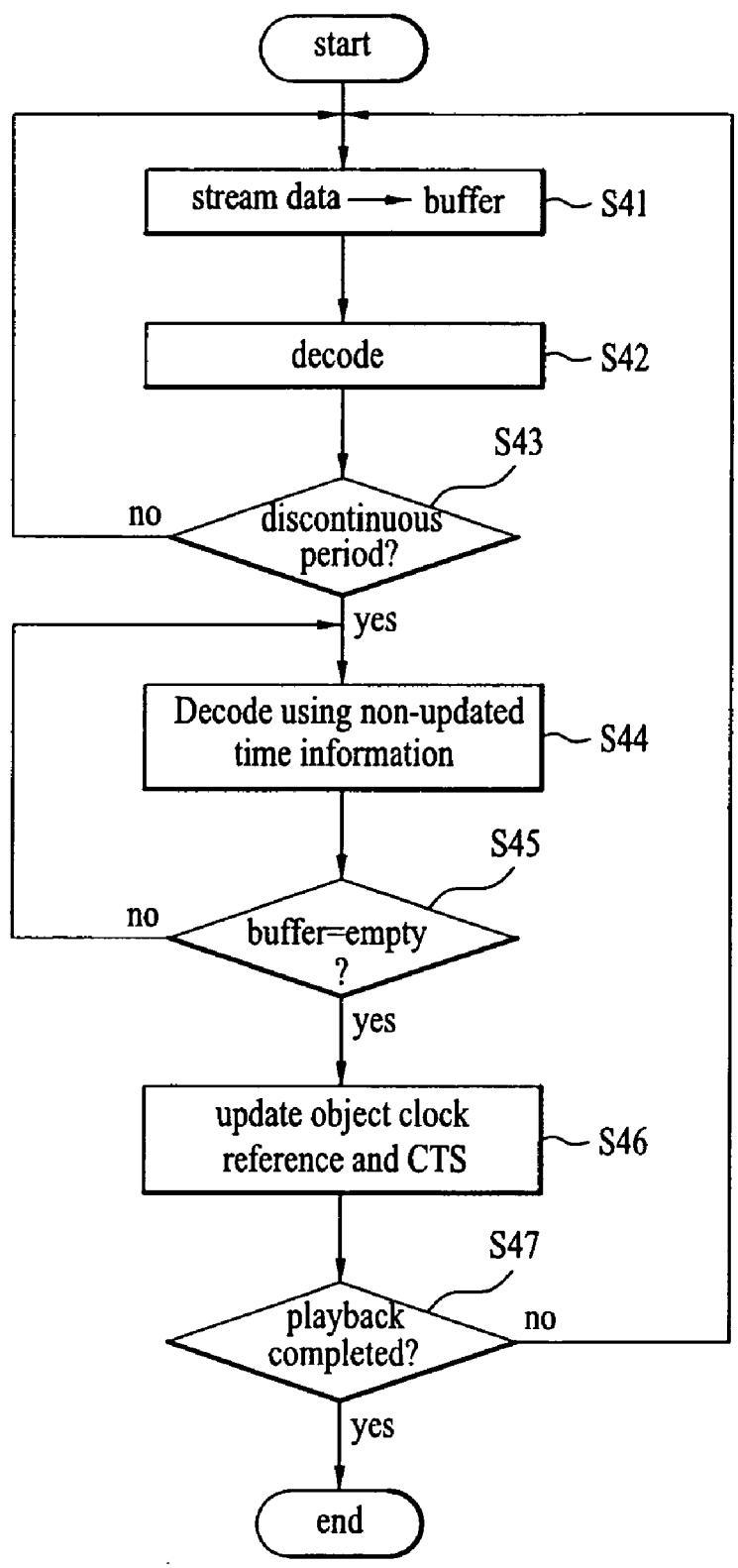
FIG. 4 is a flowchart depicting a method for decoding digital stream data according to an embodiment of the present invention.

FIG. 4 is a flowchart depicting a method for decoding digital stream data according to an embodiment of the present invention. By way of nonlimiting example only, this figure will be described in conjunction with the terminal of FIG. 3.

In accordance with an embodiment, it is initially understood that controller 150 pre-receives information from demultiplexer 120 concerning any discontinuous sections of the digital stream data requiring decoding. At block S41 the stream data is separated into A/V data, and then stored for later use. This operation may be performed by demultiplexer 120, and the separated A/V data stored in A/V buffer 130. At block S42, the separated A/V data are decoded into sound and images for subsequent output at appropriate devices, such as a speaker and display (e.g., a liquid crystal display).

At decision block S43, if a discontinuous section of the A/V data has not yet been reached (i.e., lipsync is sufficiently accurate) control flows back to block S41 so that another portion of the stream data may be decoded. As long as the discontinuous section has not yet been reached, controller 150 decodes the A/V data using reference time information CTS_new. On the other hand, if a discontinuous period is reached, then control flows to block S44.

At this point, controller 150 does not immediately use the reference time information CTS_new, but instead decodes the remaining A/V data that is stored in A/V buffer 130 using non-updated time information CTS_old (block S44). According to block S45, this decoding process is repeated until all of the A/V data within the A/V buffer has been decoded. The operation of block S45 therefore provides for decoding of all of the remaining A/V data in the A/V buffer using non-updated time information CTS_old.

After all of the A/V data has been decoded, thereby emptying A/V buffer 130, control flows to block S46. In this operation, time information CTS_old is updated with the reference time information CTS_new. According to decision block S47, if playback of the A/V data is not completed, then control flows back to block S41 and the forgoing operations are repeated. Otherwise, if playback is completed, then the playback operation terminates.

Figure 5:
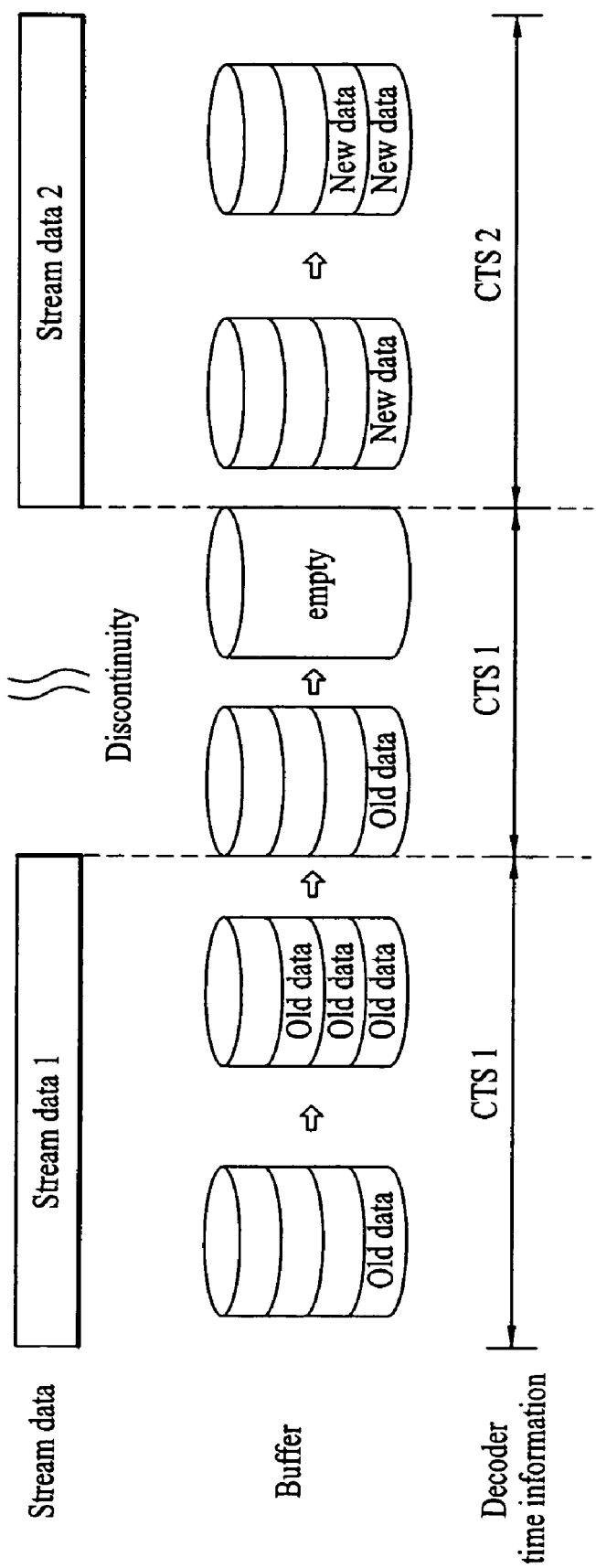
FIG. 5 is a view illustrating digital stream data decoding according to another embodiment of the present invention.

FIG. 5 is a view illustrating digital stream data decoding according to an embodiment of the present invention. Stream data recorded while passing through a compromised reception environment may result in the discontinuous period shown in FIG. 5. Stream data stored in the buffer typically includes the following aspects. First, before the discontinuous period, temporarily stored data is decoded by the decoder in a first-in-first-out (FIFO) manner. However, after the discontinuous period is reached, storage of new stream data is ceased until all of the currently stored data is decoded. Such decoding uses non-updated reference time information CTS_old. The non-updated reference time information is defined by the reference time information used for decoding the digital stream data prior to the discontinuous period After all the data that is temporarily stored in the buffer is decoded, stream data 2 is now stored in the buffer synchronously with an object clock reference. In addition, the object clock reference and time information CTS_old are updated. Therefore, it is possible to reduce a time required for audio/video Lipsync recovery resulting from time slicing of lost data resulting from a compromised reception environment, for example.

As apparent from the above description, a digital broadcasting receiving terminal and a digital stream data decoding method may be implemented to minimize errors occurring during decoding of stream data with a discontinuous period in order to recover audio/video lipsync of the stream data as rapidly as possible.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for decoding digital stream data, said method comprising:
   detecting a discontinuous period of digital stream data stored in a buffer, wherein upon detection of said discontinuous period, said method further comprises:
   decoding all currently stored portions of said digital stream data in said buffer using non-updated reference time information, said non-updated reference time information being defined by reference time information used for decoding said digital stream data prior to said discontinuous period; and
   decoding remaining portions of said digital stream data using updated reference time information.

2. The method according to claim 1, further comprising:
   receiving said digital stream data at a terminal which is moving relative to a broadcasting system providing said digital stream data.

3. The method according to claim 2, further comprising:
   storing said digital stream data in memory of a digital broadcast receiving terminal.

4. The method according to claim 1, further comprising:
   temporarily ceasing storage of new digital stream data in said buffer during said decoding of all currently stored portions of said digital stream data.

5. The method according to claim 1, further comprising:
   storing said digital stream data in said buffer.

6. The method according to claim 5, further comprising:
   temporarily ceasing said storing of said digital stream data in said buffer during said decoding of all currently stored portions of said digital stream data.

7. A method for decoding digital stream data, said method comprising:
   acquiring information about a discontinuous period contained in recorded digital stream data;
   pre-processing a portion of said digital stream data within said discontinuous period according to discontinuous period information; and
   post-processing a portion of said digital stream data subsequent to said discontinuous period according to continuous period information.

8. The method according to claim 7, wherein said pre-processing comprises:
   decoding a portion of said digital stream data stored in a buffer using a composition time stamp (CTS) that is prior to said discontinuous period; and
   detecting when said buffer is empty.

9. The method according to claim 7, wherein said post-processing comprises:
   updating an existing object clock reference with a new object clock reference; and
   storing a portion of said digital stream data to be decoded using a new composition time stamp (CTS) in a buffer.

10. The method according to claim 7, further comprising:
    receiving said digital stream data at a terminal which is moving relative to a broadcasting system providing said digital stream data.

11. The method according to claim 7, further comprising:
    storing said digital stream data in memory of a digital broadcast receiving terminal.

12. The method according to claim 7, wherein said preprocessing comprises:
    temporarily ceasing storage of new digital stream data in a buffer.

13. The method according to claim 7, wherein said post-processing comprises:
    storing said digital stream data in a buffer.

14. A digital broadcast receiving terminal, comprising:
    a memory for storing digital stream data;
    a demultiplexer for demultiplexing said digital stream data to provide audio/video (A/V) data, and for providing stream status data which identifies a presence or absence of discontinuity of said digital stream data;
    a buffer for temporarily storing said audio/video data;
    a decoder for decoding said audio/video data obtained from said buffer; and
    a controller for generating control signals to control said buffer and said decoder responsive to said stream status data.

15. The terminal according to claim 14, wherein said terminal is configured to receive said digital stream data while said terminal is moving relative to a broadcasting system providing said digital stream data.

16. The terminal according to claim 14, wherein if said stream status data indicates a presence of discontinuity of said digital stream data, said controller is further configured to:
    control said buffer to temporarily cease storage of new digital stream data in said buffer; and
    control said decoder to decode all currently stored portions of said digital stream data in said buffer using non-updated reference time information, said non-updated reference time information being defined by reference time information used for decoding said digital stream data prior to said discontinuity of said digital stream data.

17. The terminal according to claim 14, wherein said terminal is implemented using a terminal selected from the group consisting of a satellite digital broadcast receiving terminal, a terrestrial digital broadcast receiving terminal, and a satellite/terrestrial digital broadcast receiving terminal.

* * * * *